United States Patent
Hayakawa

(10) Patent No.: US 9,536,547 B2
(45) Date of Patent: Jan. 3, 2017

(54) SPEAKER CHANGE DETECTION DEVICE AND SPEAKER CHANGE DETECTION METHOD

(71) Applicant: FUJITSU LIMITED, Kawasaki-shi, Kanagawa (JP)

(72) Inventor: Shoji Hayakawa, Akashi (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/875,092

(22) Filed: Oct. 5, 2015

(65) Prior Publication Data
US 2016/0111112 A1    Apr. 21, 2016

(30) Foreign Application Priority Data

Oct. 17, 2014    (JP) .................................. 2014-213149

(51) Int. Cl.
| | | |
|---|---|---|
| G10L 25/45 | (2013.01) | |
| G10L 25/51 | (2013.01) | |
| G10L 17/02 | (2013.01) | |
| G10L 17/06 | (2013.01) | |
| G10L 17/26 | (2013.01) | |

(52) U.S. Cl.
CPC ............... *G10L 25/51* (2013.01); *G10L 17/02* (2013.01); *G10L 17/06* (2013.01); *G10L 17/26* (2013.01); *G10L 25/45* (2013.01)

(58) Field of Classification Search
CPC .......... G10L 17/06; G10L 17/26; G10L 25/45; G10L 25/51
See application file for complete search history.

(56) References Cited

U.S. PATENT DOCUMENTS 5,675,704 A * 10/1997 Juang ..................... G10L 17/00
                                                                704/246
6,233,556 B1 * 5/2001 Teunen ................... G10L 15/20
                                                                704/250
(Continued)

FOREIGN PATENT DOCUMENTS

| JP | 2008-175955 | 7/2008 |
| JP | 2011-242755 | 12/2011 |

(Continued)

OTHER PUBLICATIONS

Daben Liu et al.; "Online Speaker Clustering", In Proc of ICASSP2004, vol. 1, pp. 333-336 (4 pages).

*Primary Examiner* — Eric Yen
(74) *Attorney, Agent, or Firm* — Fujitsu Patent Center

(57) ABSTRACT

A speaker change detection device sets first and second analysis periods before and after each of time points in a voice signal, generates, for each of the time points, a first speaker model from a distribution of features in frames in the first analysis period, and a second speaker model from a distribution of features in frames in the second analysis period, calculates, for each of the time points, a matching score representing the likelihood of similarity of features between a group of speakers in the first analysis period and a group of speakers in the second analysis period by applying the features extracted from the second analysis period to the first speaker model and applying the features extracted from the first analysis period to the second speaker model, and detects a speaker change point on the basis of the matching scores at the plurality of time points.

7 Claims, 8 Drawing Sheets

(56) References Cited

U.S. PATENT DOCUMENTS

| | | | | |
|---|---|---|---|---|
| 9,324,322 B1* | 4/2016 | Torok | .................. | G10L 15/22 |
| 2004/0172252 A1* | 9/2004 | Aoki | .................. | H04M 3/564 |
| | | | | 704/270 |
| 2007/0265848 A1* | 11/2007 | Chaudhari | .............. | G10L 17/06 |
| | | | | 704/240 |
| 2008/0215324 A1 | 9/2008 | Hirohata | | |
| 2010/0114572 A1 | 5/2010 | Tani et al. | | |
| 2011/0282666 A1 | 11/2011 | Washio et al. | | |
| 2012/0239400 A1* | 9/2012 | Koshinaka | .............. | G10L 17/16 |
| | | | | 704/249 |
| 2015/0025887 A1* | 1/2015 | Sidi | .................. | G10L 17/16 |
| | | | | 704/245 |
| 2015/0058017 A1* | 2/2015 | Singh | .................. | G06F 21/10 |
| | | | | 704/249 |

FOREIGN PATENT DOCUMENTS

| | | |
|---|---|---|
| WO | 2008/117626 | 10/2008 |
| WO | 2011/064938 | 6/2011 |

* cited by examiner

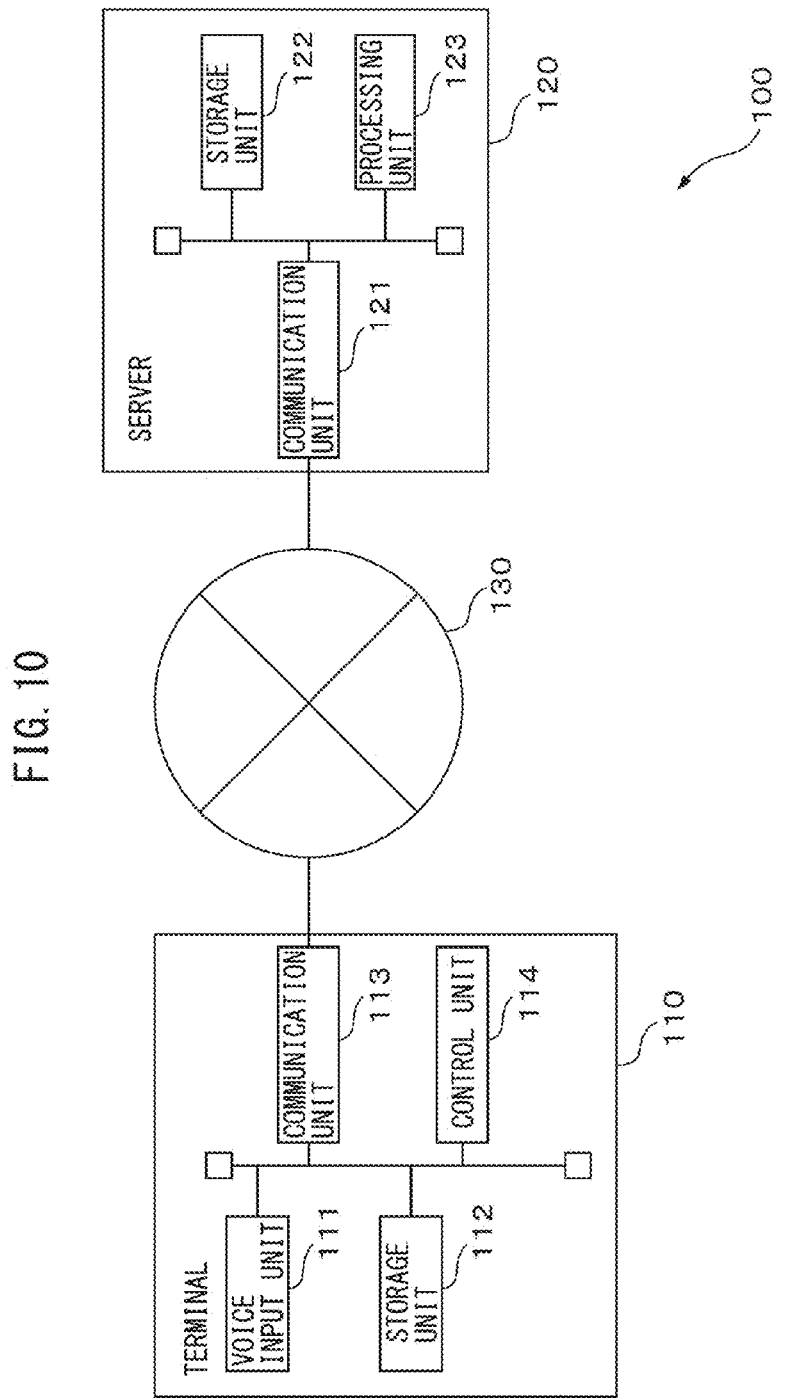

SPEAKER CHANGE DETECTION DEVICE AND SPEAKER CHANGE DETECTION METHOD

CROSS-REFERENCE TO RELATED APPLICATION

This application is based upon and claims the benefit of priority of the prior Japanese Patent Application No. 2014-213149, filed on Oct. 17, 2014, and the entire contents of which are incorporated herein by reference.

FIELD

The embodiments discussed herein are related to a speaker change detecting device, a speaker change detection method, and a computer program for speaker change detection, that detect a change of a group of speakers speaking in a voice signal in which conversation of a plurality of speakers is recorded.

BACKGROUND

Fraud and other malicious solicitations using telephones with an aim to defraud people of money have become a social problem in recent years. To address this, techniques have been proposed for estimating a speaker's state of mind by analyzing the speaker's voice during conversations such as voice in telephone conversations (see Japanese Laid-open Patent Publication No. 2011-242755, for example).

The techniques are based on analysis of a voice signal including the voice of one speaker whose state of mind is to be analyzed. However, a voice signal in a recorded conversation includes the voices of two or more speakers. In order to accurately estimate the state of mind of a particular speaker on the basis of a voice signal in a recorded conversation, an utterance period of the speaker whose state of mind is to be estimated needs to be identified from the voice signal. For this purpose, speaker indexing techniques have been proposed that can assign identification information identifying each speaker to a period in which the speaker has spoken in a monaural voice signal including voices of a plurality of speakers (for example, Japanese Laid-open Patent Publication No. 2008-175955 and D. Liu and F. Kubala, "Online speaker clustering", In Proceedings of ICASSP 2004, vol. 1, pp. 333-337, 2004 (hereinafter referred to as Non-Patent Literature 1)).

SUMMARY

In some situations, a group of speakers in a conversation may be changed by replacing speakers in a conversation with other speakers in the middle of the conversation. However, the technique described in Japanese Laid-open Patent Publication No. 2008-175955 or Non-Patent Literature 1 is based on the assumption that a group of speakers do not change. Accordingly, the technique described in Japanese Laid-open Patent Publication No. 2008-175955 or Non-Patent Literature 1 may not detect a change of a group of speakers in a conversation that has occurred in the middle of a voice signal. Therefore these techniques may assign a label representing the same speaker to an utterance period of two or more different speakers regardless the change of a group of speakers. In analysis of the state of mind of a speaker, when a label representing the same speaker is assigned to an utterance period of two or more different speakers, analysis of the state of mind is performed, an utterance period of two or more different speakers to which the same labels is assigned will be treated as an utterance period of one speaker. As a result, it is difficult to accurately estimate the state of mind of a speaker.

According to one embodiment, a speaker change detection device is provided. The speaker change detection device includes a processor configured to: extract features representing features of human voice in each frame having a predetermined time length from a voice signal including a conversation between a plurality of speakers; set, for each of a plurality of different time points in the voice signal, a first analysis period before the time point and a second analysis period after the time point; generate, for each of the plurality of time points, a first speaker model representing features of voices of a group of at least two speakers speaking in the first analysis period on the basis of a distribution of the features of a plurality of frames included in the first analysis period and a second speaker model representing features of voices of a group of at least two speakers speaking in the second analysis period on the basis of a distribution of the features in a plurality of frames included in the second analysis period; calculate, for each of the plurality of time points, a matching score representing the likelihood of similarity of features between the group of speakers in the first analysis period and the group of speakers in the second analysis period by applying the features in a plurality of frames included in the second analysis period to the first speaker model and applying the features of a plurality of frames included in the first analysis period to the second speaker model; and detect a speaker change point at which a change from a group of speakers speaking before the speaker change point to another group of speakers speaking after the speaker change point occurs in the voice signal on the basis of the matching score for each of the plurality of time points.

The object and advantages of the invention will be realized and attained by means of the elements and combinations particularly pointed out in the claims.

It is to be understood that both the foregoing general description and the following detailed description are exemplary and explanatory and are not respective of the invention, as claimed.

BRIEF DESCRIPTION OF THE DRAWINGS

FIG. 10 is a schematic configuration diagram of a server-client system in which a speaker change detection device according to any of embodiments or their variations is implemented.

DESCRIPTION OF EMBODIMENTS

A speaker change detection device will be described below with reference to drawings. The speaker change detection device divides a monaural voice signal in a recorded conversation between speakers into frames and extracts features representing features of human voice from each of the frames. The speaker change detection device generates a speaker model representing features of voices of a group of speakers speaking in each of two analysis periods set before and after a time point of interest in a voice signal on the basis of a distribution of features included in the analysis period. In other words, the speaker change detection device models features of the voices of a plurality of speakers with a single speaker model. The speaker change detection device calculates a matching score which can be obtained by inputting features in one of the analysis periods into the speaker model of the other analysis period. The matching score will be relatively high when the groups of speakers speaking in the two analysis periods are the same. On the other hand, when at least one of the speakers in the group of speakers changes at a time point of interest, a relatively low matching score will result. The speaker change detection device shifts the time point of interest bit by bit and calculates the matching score at each time point. The speaker change detection device detects a time point at which the matching score is the local minimum and less than or equal to a predetermined detection threshold as a time point at which the group of speakers has changed.

Note that a change of at least one of the speakers in a group of speakers will be hereinafter simply referred to as a change of a group of speakers. For example, the term "a change of a group of speakers" encompasses not only a change from a conversation between speaker 'A' and speaker 'B' to a conversation between speaker 'C' and speaker 'D' but also a change from one of speaker 'A' and speaker 'B' to speaker 'C'. A time point in a voice signal at which a change from a group of speakers to another group occurs will be referred to as a speaker change point for convenience. Note that the number of speakers included in a group of speakers is not limited to two but may be more than two.

Figure 1:
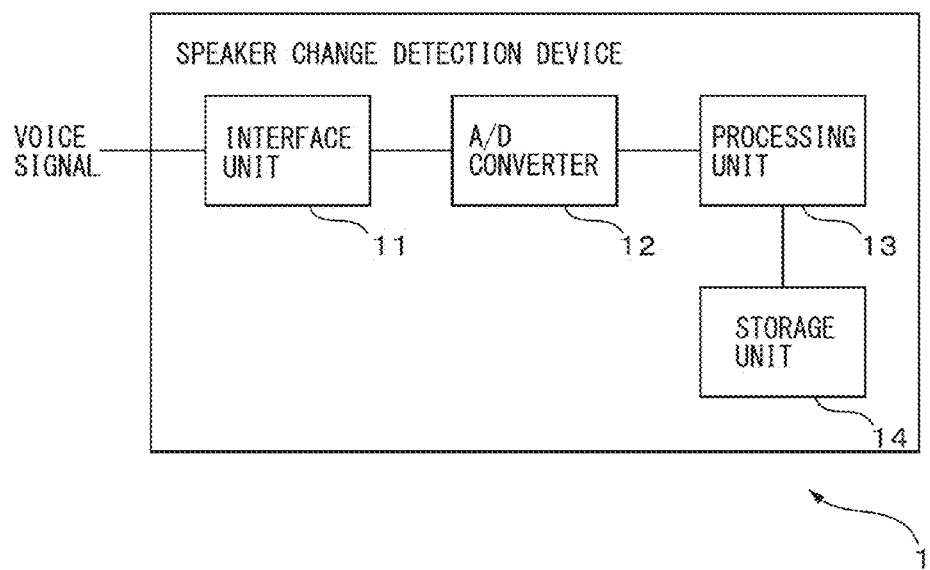
FIG. 1 is a schematic configuration diagram of a speaker change detection device according to one embodiment.

FIG. 1 is a schematic configuration diagram of a speaker change detection device according to one embodiment. The speaker change detection device 1 includes an interface unit 11, an analog-digital converter 12, a processing unit 13 and a storage unit 14.

The interface unit 11 is one example of a voice input unit and includes an audio interface. The interface unit 11 acquires, for example, a monaural voice signal which is an analog signal and includes voices in a conversation between a sending-end speaker and a receiving-end speaker from a telephone conversation recording adapter (not depicted) connected to a telephone line. The interface unit 11 outputs the voice signal to the analog-digital converter 12 (hereinafter referred to as the A/D converter). The A/D converter 12 samples the analog voice signal at a predetermined sampling rate to digitize the voice signal. The A/D converter 12 outputs the digitized voice signal to the processing unit 13.

The processing unit 13 includes one or more processors, a memory circuit and peripheral circuitry, for example. The processing unit 13 executes a speaker change detection process to add identification information identifying a speaker speaking in each frame to the frame on the basis of the digitized voice signal. The speaker change detection process executed by the processing unit 13 will be described later in detail.

The storage unit 14 includes a readable-writable nonvolatile semiconductor memory and a readable-writable volatile semiconductor memory, for example. The storage unit 14 stores a voice signal to be subjected to the speaker change detection process executed on the processing unit 13, various kinds of data used in the speaker change detection process, and various kinds of data generated during the speaker change detection process. The storage unit 14 also stores a voice signal to which information that can be obtained by the processing unit 13 executing the speaker change detection process and indicates a time point at which a group of speakers has changed is added.

The speaker change detection process by the processing unit 13 will be described in detail below.

Figure 2:
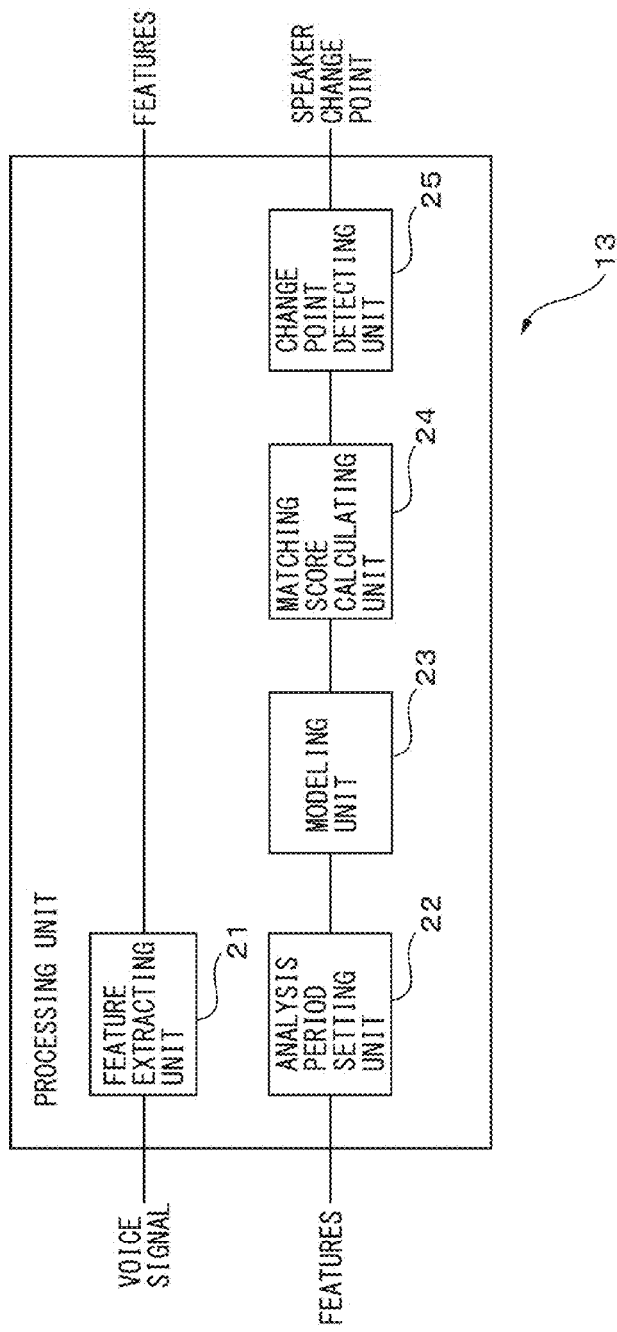
FIG. 2 is a functional block diagram of a processing unit of the speaker change detection device.

FIG. 2 is a functional block diagram of the processing unit 13. The processing unit 13 includes a feature extracting unit 21, an analysis period setting unit 22, a modeling unit 23, a matching score calculating unit 24, and a change point detecting unit 25. The units of the processing unit 13 are functional modules which are implemented by a computer program running on a processor of the processing unit 13. Alternatively, the units of the processing unit 13 may be implemented as one or more integrated circuits that implement the functions of the units.

The feature extracting unit 21 divides a digitized voice signal (hereinafter simply referred to as a voice signal) into frames that have a predetermined length and extracts at least one feature representing a feature of human voice from each frame. The frame length in this embodiment is set to 32 msec, for example. In this case, one frame includes 256 sample points at a sampling rate of 8 KHz of the A/D converter 12.

In this embodiment, the feature extracting unit 21 extracts a cepstrum, which is spectrum envelope information representing a resonance characteristic of the vocal tract of a speaker, as a feature representing a feature of human voice. For example, the feature extracting unit 21 may use, as the cepstrum, an FFT cepstrum obtained by obtaining the logarithm of a value of each frequency of a power spectrum, taking the inverse Fourier transform of the logarithms, and selecting a low-order value. Alternatively, the feature extracting unit 21 can use, as the cepstrum, an LPC cepstrum obtained from linear predictor coefficients which can be obtained by linear prediction analysis. Alternatively, the feature extracting unit 21 may use, as the cepstrum, Mel Frequency Cepstral Coefficients (MFCC), which can be calculated by taking the Discrete Cosign Transform (DCT) of a the logarithm of an output from each of filter banks that are arranged evenly spaced apart so that each filter's center frequency follows the mel scale. Note that the feature extracting unit 21 can choose a coefficient of a predetermined order (for example in the range of the 1st to 12th orders) among the calculated cepstrums as a feature.

The feature extracting unit 21 stores features in each frame in the storage unit 14.

Note that the feature extracting unit 21 may obtain an integrated value of power and a pitch frequency, which are prosodic information, from each frame as features. Alternatively, the feature extracting unit 21 may obtain an autocorrelation function on the basis of a spectrum signal in the frequency domain which can be obtained by time-frequency transform of a voice signal in each frame. Alternatively, the feature extracting unit 21 may obtain a plurality of features in each frame.

The autocorrelation function can be obtained by taking the inverse Fourier transform of the power spectrum of each frequency. The feature extracting unit 21 can use Fast Fourier Transform (FFT), for example, as the time-frequency transform.

When a pitch frequency is used as a feature, the feature extracting unit 21 obtains the maximum value (excluding a peak value for a time difference of 0) among peak values of the autocorrelation function or a modified autocorrelation function for each frame in order to calculate a pitch frequency. The maximum value of autocorrelation in a frame that corresponds to human voiced sound is relatively large whereas the maximum value of autocorrelation in a frame that corresponds to a silent or background noise is small or clear peaks do not appear in such a frame. The feature extracting unit 21 compares the maximum one of the peak values with a predetermined threshold and, when the maximum peak value is greater than the predetermined threshold, the feature extracting unit 21 determines that the frame includes voiced sound of a speaker. The feature extracting unit 21 then obtains the reciprocal of the time difference that is equivalent to the maximum peak value as a pitch frequency.

The feature extracting unit 21 may obtain, as a feature, a normalized pitch frequency which can be obtained by dividing a pitch frequency by a predetermined value. Similarly, the feature extracting unit 21 may obtain, as a feature, a normalized integrated power value which can be obtained by dividing an integrated power value by a predetermined value. Furthermore, the feature extracting unit 21 may compare an integrated power value with a noise determination threshold Thn representing a noise component contained in a frame and may store a set of features only for frames in which the integrated power values are greater than the noise determination threshold Thn in the storage unit 14. This allows the processing unit 13 to prevent a set of features extracted from a frame during which no speaker has been speaking from affecting speaker change detection.

It is preferable to adaptively set the noise determination threshold Thn in accordance with the level of background noise in a voice signal in a telephone conversation. For this purpose, the feature extracting unit 21 determines that a frame in which no speaker is speaking is a silent frame that contains only background noise. For example, the feature extracting unit 21 determines a frame in which the integrated value of power spectrum is less than a predetermined power threshold to be a silent frame. The feature extracting unit 21 then estimates the level of background noise on the basis of the integrated value of power in the silent frame. For example, the feature extracting unit 21 estimates the level of background noise in accordance with the following equation.

$$noiseP' = 0.01 \cdot Ps + 0.99 \cdot noiseP \quad (1)$$

where Ps is an integrated value of power in the latest silent frame, noiseP is the level of background noise before updating, and noiseP' is the level of background noise after the updating. In this case, for example, the noise determination threshold Thn can be set according to the following equation.

$$Thn = noiseP + \gamma \quad (2)$$

where $\gamma$ is a preset constant and may be set to a value in the range of 3 to 10 [dB], for example.

When acquisition of a voice signal from which a speaker change is to be detected ends, the analysis period setting unit 22 sets an analysis period having a predetermined time length before and after each candidate speaker change point set in the voice signal. The analysis period setting unit 22 sets candidate speaker change points at predetermined intervals in sequence from a point after a length of time equivalent to the length of the analysis period elapsed since the start of a voice signal to a time point a predetermined length of time equivalent to the length of the analysis period before the end of the voice signal, for example. The predetermined intervals are set to a value in the range of 0.5 seconds to 5 seconds, for example.

To accurately obtain a speaker model, it is preferable that an analysis period has a length greater than a certain length. In this regard, for example, Reynolds et al., "Robust Text-Independent Speaker Identification Using Gaussian Mixture Speaker Models", IEEE Trans., Speech and Audio Process., vol. 3, No. 1, pp. 72-83, 1995 describes speaker identification performances when the length of a period used for speaker model learning was set at 30 seconds, 60 seconds and 90 seconds. According to this literature, the difference between the speaker identification performance when the length of the period used for the speaker model training is 60 seconds and the speaker identification performance when the period is 90 seconds is significantly smaller than the difference between the speaker identification performance when the period is 30 seconds and the speaker identification performance when the period is 60 seconds. When the length of the period is greater than or equal to 60 seconds, the accuracy of speaker identification is 90% or higher. Accordingly, it is preferable to set the length of the analysis period to 60 seconds or more.

Figure 3:
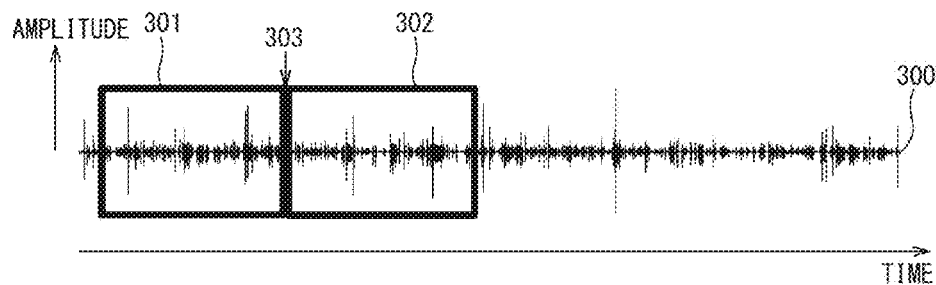
FIG. 3 is a diagram illustrating an example of an analysis period.

FIG. 3 is a diagram illustrating one example of analysis intervals. In FIG. 3, the horizontal axis represents time and the vertical axis represents the amplitude of a voice signal. As illustrated in FIG. 3, the analysis period setting unit 22 sets analysis periods for a voice signal 300 so that the boundary between two analysis periods 301 and 302 is a candidate speaker change point 303. Note that two analysis periods do not need to be adjacent to each other. For example, the analysis period setting unit 22 may set two analysis periods so that an interval period of a predetermine length of time (for example a length of time in the range of 0.1 seconds to 1 second) is provided between the two analysis periods and the midpoint of the interval period is a candidate speaker change point.

The modeling unit 23 models the distribution of features in the frames included in each of two analysis periods set for each candidate speaker change point with a mixture distribution including a plurality of probability distributions. The mixture distribution corresponds to a speaker model representing features of voices of speakers included in a group of speakers who have spoken in the analysis period. Note that in the following description, when a plurality of features are extracted from one frame, the term "features" means a feature set including a plurality of features extracted from one frame unless otherwise stated.

Different speakers have different voice features and features extracted from frames in which the same speaker has spoken are likely to have relatively similar values. Accordingly, the modeling unit 23 in this embodiment classifies features in the frames included in an analysis period of interest into a plurality of clusters by using a clustering method such as the k-means method or the nearest neighbor method. The modeling unit 23 then obtains the mean vector and covariance matrix of the features included in each cluster to obtain a Gaussian distribution for the cluster. The modeling unit 23 generates a Gaussian mixture distribution including the obtained Gaussian distributions as a speaker model. In this case, a speaker model can be written as the following equation.

$$f(x; w, \mu, \Sigma) = \sum_{i=1}^{n} \frac{w_i}{(2\pi)^{\frac{d}{2}}|\Sigma_i|} \exp\left(-\frac{1}{2}(x-\mu_i)^t \Sigma_i^{-1}(x-\mu_i)\right) \quad (3)$$

where each of $w_i$ (i=1, 2, . . . , n) is a weighting factor for a Gaussian distribution i. d is a dimension of feature vector x. The weighting factor $W_i$ is, for example, the ratio of the number of frames from which features that are included in the cluster corresponding to the Gaussian distribution i have been extracted to the total number of frames which are included in an analysis period and features have been extracted from. $\mu_i$ is the mean vector of features of the Gaussian distribution i. $\Sigma_i$ is the covariance matrix of the Gaussian distribution i.

Alternatively, the modeling unit 23 may perform maximum likelihood estimation of a plurality of parameters (weighting factor $W_i$, mean vector $\mu_i$ and covariance matrix $\Sigma_i$) representing Gaussian distributions included in a mixture distribution by using features in the frames included in an analysis period as learning samples. In this case, the modeling unit 23 can use an EM algorithm (also referred to as expectation-maximization method), for example, as the maximum likelihood estimation method. The modeling unit 23 may use a Markov chain Monte Carlo method or simulated annealing instead of an EM algorithm to obtain a plurality of parameters representing the Gaussian distributions included in a mixture distribution.

Alternatively, the modeling unit 23 may use Maximum A Posteriori (MAP) estimation to obtain a speaker model of each analysis period. In this case, the modeling unit 23 first applies an EM algorithm to features in frames to generate a mixture distribution from a whole voice signal. The mixture distribution will be hereinafter referred to as a Whole Model (WM). The modeling unit 23 then sets, for example, an analysis period before the first candidate speaker change point set in the voice signal as the first analysis period. The modeling unit 23 then updates the weighting factor, the mean value and the covariance matrix of each Gaussian distribution in the mixture distribution on the basis of features in each frame in the first analysis period to obtain a mixture distribution for the analysis period. Similarly, the modeling unit 23 shifts the first analysis period later by the interval between candidate speaker change points and sets the resulting analysis period as the next analysis period. The modeling unit 23 then updates the weighting factors, the mean value and the covariance matrix for each Gaussian distribution included in the mixture distribution in the first analysis period on the basis of features in each frame in the next analysis period. The modeling unit 23 can obtain the mixture distribution for each analysis period by repeating the same or similar process. According to this method, the modeling unit 23 does not need to perform clustering for every candidate speaker change and therefore the amount of computation for obtaining the mixture distributions for analysis periods can be reduced. For details of generation of a speaker model using the MAP estimation, refer to Reynolds et al., "Speaker Verification Using Gaussian Mixture Models", Digital Signal Processing, Vol. 10, Nos. 1-3, pp. 19-41.

The modeling unit 23 provides parameters representing the speaker model of each of two analysis periods set for each candidate speaker change point to the matching score calculating unit 24.

The matching score calculating unit 24 calculates a matching score representing the likelihood of similarity between features of groups of speakers for each candidate speaker change point.

Figure 4:
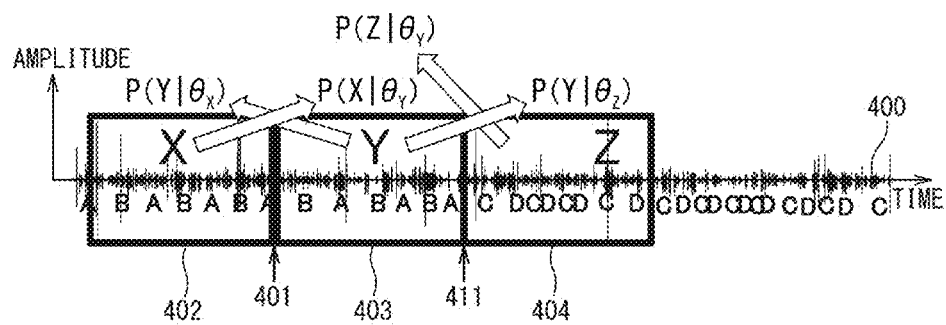
FIG. 4 is a diagram illustrating a principle for detecting a speaker change point.

FIG. 4 is a diagram illustrating a principle for detecting a speaker change point. In FIG. 4, the horizontal axis represents time and the vertical axis represents the amplitude of a voice signal. Symbols 'A' to 'D' under the voice signal 400 represent speakers speaking at the time points indicated by the symbols.

In two analysis periods 402 and 403 set for a candidate speaker change point 401, speakers 'A' and 'B' are speaking. Accordingly, the difference between a mixture distribution $\theta_X$ obtained as a speaker model of the analysis period 402 and a mixture distribution $\theta_Y$ obtained as a speaker model of the analysis period 403 is relatively small. A vector whose elements are features extracted from each frame included in the analysis period 402 is referred to as a feature vector X. Likelihood $P(X|\theta_Y)$ that can be obtained by inputting the feature vector X into the mixture distribution $\theta_Y$ obtained for the analysis period 403 has a value relatively close to likelihood $P(x|\theta_X)$ that can be obtained by inputting the feature vector X into the mixture distribution $\theta_X$. Similarly, a vector whose elements are features extracted from each frame included in the analysis period 403 is referred to as a feature parameter vector Y. Likelihood $P(Y|\theta_X)$ that can be obtained by inputting the feature vector Y into the mixture distribution $\theta_X$ obtained for the analysis period 402 has a value also relatively close to likelihood $P(Y|\theta_Y)$ that can be obtained by inputting the feature vector Y into the mixture distribution $\theta_Y$.

On the other hand, the group of speakers speaking in the analysis period 403 set before a candidate speaker change point 411 differs from the group of speakers speaking in an analysis period 404 set after the candidate speaker change point 411. Specifically, speakers 'A' and 'B' are speaking in the analysis period 403 whereas speakers 'C' and 'D' are speaking in the analysis period 404. Accordingly, the difference between a mixture distribution $\theta_Z$ obtained as a speaker model of the analysis period 404 and the mixture distribution $\theta_Y$ obtained as the speaker model of the analysis period 403 is relatively large. Therefore, likelihood $P(Y|\theta_Z)$ that can be obtained by inputting the feature vector Y extracted from each frame included in the analysis period 403 into the mixture distribution $\theta_Z$ obtained for the analysis period 404 is likely to be smaller than the likelihood $P(Y|\theta_Y)$. Similarly, likelihood $P(Z|\theta_Y)$ that can be obtained by inputting a feature vector Z extracted from each frame included in the analysis period 404 into the mixture distribution $\theta_Y$ obtained for the analysis period 403 is likely to be smaller than the likelihood $P(Z|\theta_Z)$.

In this way, the value of likelihood that can be obtained by inputting a feature vector obtained from one of the two analysis periods that are set before (past) and after (future) a candidate speaker change point into the other mixture distribution significantly varies depending on the groups of speakers included in the two analysis periods are the same or not. Therefore, for each candidate speaker change point, the matching score calculating unit 24 applies the feature vector obtained from the succeeding analysis period to the speaker model of the preceding analysis period and applies the feature vector obtained from the preceding analysis period to the speaker model of the succeeding analysis period to calculate a matching score. For example, the matching score calculating unit 24 calculates the cross entropy between the speaker models of two analysis periods as the matching score in accordance with the following equation.

$$\text{matching score } (X_n; Y_n) = \log\left\{\frac{P(X_n|\theta_{Y_n}) \cdot P(Y_n|\theta_{X_n})}{P(X_n|\theta_{X_n}) \cdot P(Y_n|\theta_{Y_n})}\right\} \quad (4)$$

where n represents the index of a candidate speaker change point of interest. The vector $X_n$ is a feature vector in which features in frames extracted from the analysis period before the candidate speaker change point of interest are arranged in a time sequence. Similarly, the vector $Y_n$ is a feature vector in which features in frames extracted from the analysis period after the candidate speaker change point n of interest are arranged in a time sequence. $\theta_{X_n}$ is a speaker model obtained for the analysis period before the candidate speaker change point of interest. Similarly, $\theta_{Y_n}$ is a speaker model obtained for the analysis period after the candidate speaker change point of interest. P(a|b) is likelihood which can be obtained by inputting a feature vector a into a speaker model b. The likelihood P(a|b) is calculated as the product of probabilities obtained by inputting the futures included in the feature vector a into a mixture distribution which is a speaker model.

Alternatively, when speaker models of analysis periods are generated using MAP estimation, the matching score calculating unit 24 may calculate a matching score for each candidate speaker change point in accordance with the following equation instead of equation (4).

$$\text{matching score } (X_n; Y_n) = \log\left\{\frac{P(X_n|\theta_{Y_n}) \cdot P(Y_n|\theta_{X_n})}{P(X_n|\theta_{ALL}) \cdot P(Y_n|\theta_{ALL})}\right\} \quad (5)$$

where $\theta_{ALL}$ is a WM, which is a speaker model obtained for the analysis period over the whole voice signal. Alternatively, $\theta_{ALL}$ may be a speaker-independent model, "Universal Background Model (UBM)", leaned from voices of many speakers, used in the field of speaker recognition. $P(X_n|\theta_{ALL})$ and $P(Y_n|\theta_{ALL})$ are likelihoods which can be obtained by inputting a feature vector $X_n$ extracted from the analysis period before a candidate speaker change point of interest and a feature vector $Y_n$ extracted from the analysis period after the candidate speaker change point of interest, respectively, into the speaker model $\theta_{ALL}$. Note that the matching score calculating unit 24 may directly use the ratio between the likelihoods as a matching score, instead of using the log function in equation (4) or (5).

The matching score calculating unit 24 stores the matching score for each candidate speaker change point in the storage unit 14.

The change point detecting unit 25 detects a speaker change point which is a time point at which a change from one group of speakers to another occurs in a voice signal on the basis of the matching scores of candidate speaker change points.

Figure 5:
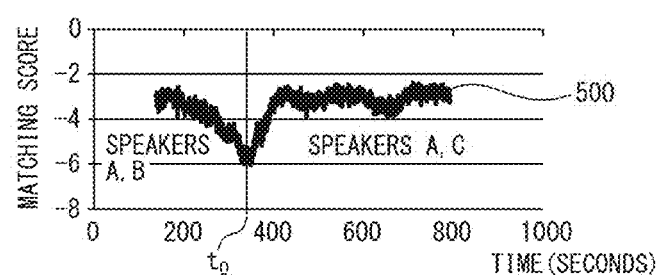
FIG. 5 is a diagram illustrating an example of transition in matching score.

FIG. 5 is a diagram illustrating an example of transition in matching score. In FIG. 5, the horizontal axis represents time and the vertical axis represents matching score. Plot 500 represents changes in the matching score. In this example, speakers 'A' and 'B' are speaking before time $t_0$ whereas speakers 'A' and 'C' are speaking after time $t_0$. In other words, there is a speaker group change at time $t_0$.

As illustrated in plot 500, the matching score is lowest at time $t_0$. This is because likelihood $P(X_n|\theta_{Y_n})$ and likelihood $P(Y_n|\theta_{X_n})$ in the equation for calculating the matching score are relatively small at a speaker change point as described with reference to FIG. 4.

The change point detecting unit 25 determines whether or not the lowest matching score among matching scores of candidate speaker change points is lower than or equal to a predetermined detection threshold. When the lowest matching score is lower than or equal to the detection threshold, the change point detecting unit 25 determines the candidate speaker change point corresponding to the lowest matching score to be a speaker change point. Note that the detection threshold is set to a value in the range of −4 to −5, for example.

Figure 6:
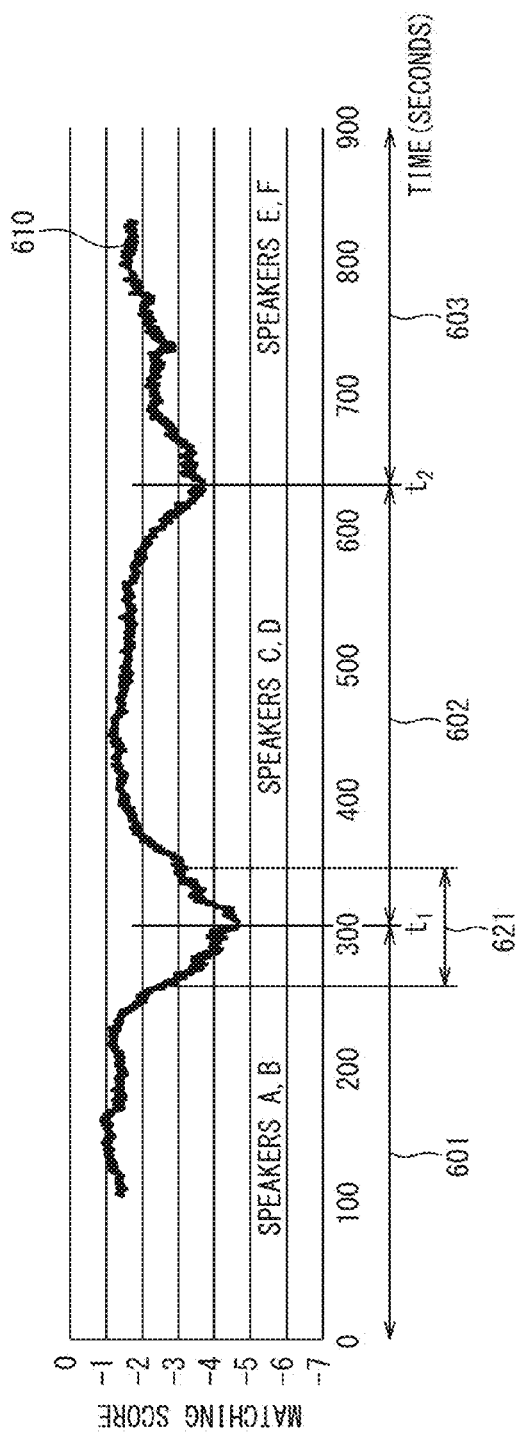
FIG. 6 is a diagram illustrating an example of transition in matching score when there are multiple speaker group changes.

Note that there may be multiple speaker group changes in a single voice signal. FIG. 6 is a diagram illustrating an example of transition in matching score where multiple speaker group changes occur. In FIG. 6, the horizontal axis represents time and the vertical axis represents matching score. In this example, speakers 'A' and 'B' are speaking in a period 601 before time $t_1$. In a period 602 between time $t_1$ and time $t_2$, speakers 'C' and 'D' are speaking. In a period 603 after time $t_2$, speakers 'E' and 'F' are speaking. As can be seen from matching score changes 610, the matching score is local minimum at time $t_1$ and time $t_2$.

Accordingly, the change point detecting unit 25 may detect a lowest matching score in a period excluding predetermined time periods before and after the speaker change point initially detected by the process described above (for example one minute before and after the speaker change point). When the lowest value is lower than or equal to the detection threshold, the change point detecting unit 25 may also determine the candidate speaker change point that corresponds to the lowest value to be a speaker change point. The change point detecting unit 25 can detect a plurality of speaker change points by repeating the process described above until the lowest matching score is greater than the detection threshold in a period excluding predetermined time periods before and after the speaker change point detected. For example, time $t_1$ at which the matching score is the lowest among local minimum matching scores is first detected as a speaker change point and a period 621 during which the local minimum value of the matching score is not detected is set around time $t_1$ in the example in FIG. 6. Time $t_2$ at which the matching score is the lowest in a period other than the period 621 is detected as a speaker change point.

The processing unit 13 may use the result of the speaker change detection to estimate, for the voice signal, the state of mind of any of the speakers joining a conversation recorded in the voice signal. In this case, the processing unit 13 identifies an utterance period of each speaker, for example, by using the speaker indexing technique disclosed in Japanese Laid-open Patent Publication No. 2008-175955 or Non-Patent Literature 1 cited above for each period in which the same group of speakers are speaking. Alternatively, the processing unit 13 may identify an utterance period of each speaker only in the longest period among the periods in which the same speaker group are speaking or the last period among the periods in which the same group of speakers are speaking. The processing unit 13 can determine whether or not the conversation is an abnormal conversation in which the state of mind of any of the speakers is not normal by using any of various techniques for analyzing a voice signal including the voice of a particular one speaker to estimate the state of mind of the speaker. Alternatively, the processing unit 13 can determine whether or not the telephone conversation is about a particular topic by using any of various techniques for analyzing a voice signal including the voice produced by a particular one speaker to estimate the state of mind of the speaker. As one of such techniques that can be used for estimating the state of mind of a speaker, the processing unit 13 can use the technique disclosed in Japanese Laid-open Patent Publication No. 2013-156524, for example.

Figure 7:
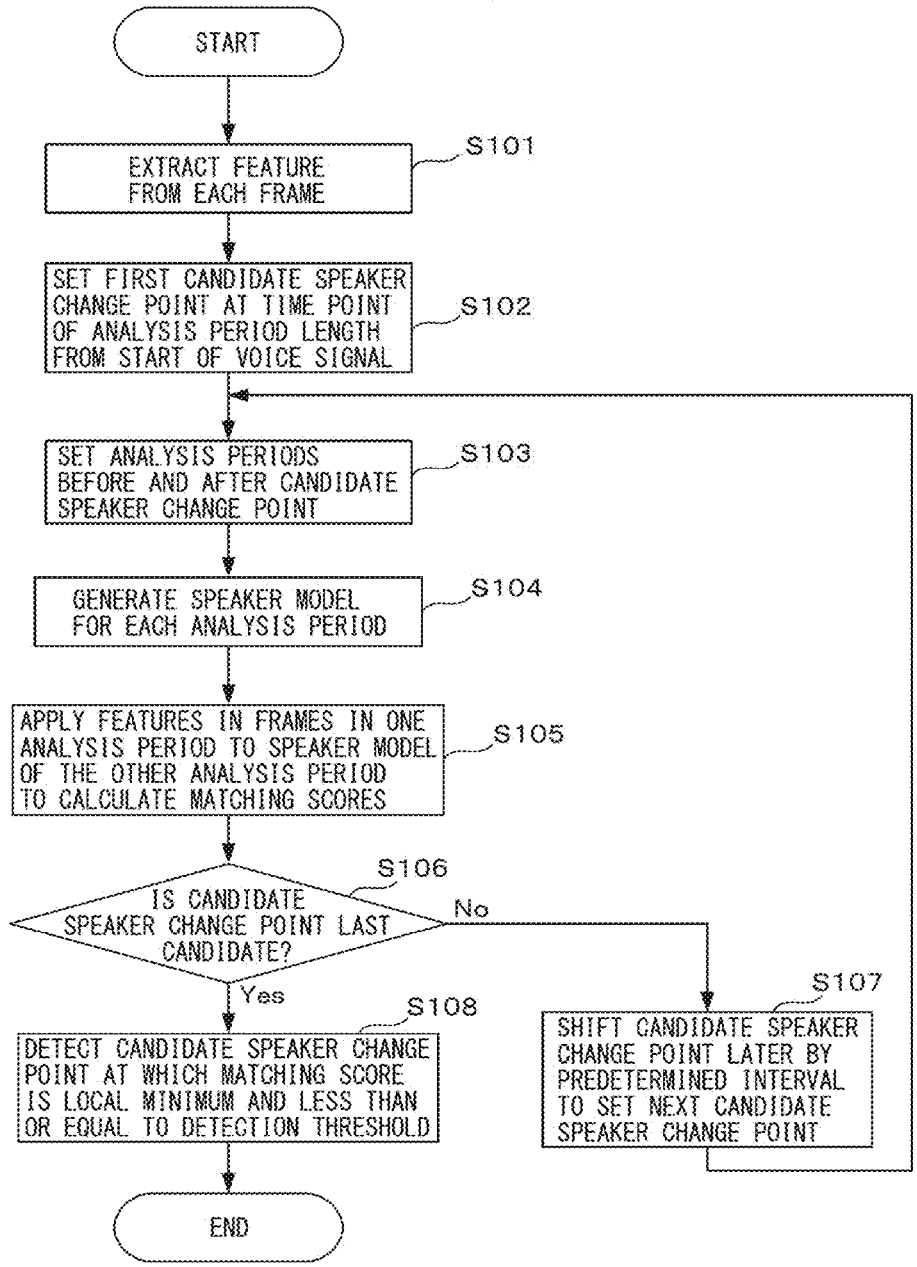
FIG. 7 is an operation flowchart of a speaker change detection process.

FIG. 7 is an operation flowchart of the speaker change detection process according to this embodiment. The feature extracting unit 21 divides a voice signal including conversation voices of multiple speakers into frames and extracts features representing features of voices of speakers from each frame (step S101). The feature extracting unit 21 then stores the features from the frames in the storage unit 14.

When features have been acquired from the frames, the analysis period setting unit 22 sets the time point after a length of time equivalent to the length of the analysis period elapsed since the start of a voice signal as the first candidate speaker change point (step S102). The analysis period setting unit 22 then sets analysis periods before and after the candidate speaker change point (step S103). The modeling unit 23 reads, for each analysis period, features in the frames included in the analysis period from the storage unit 14 and models the distribution of the features with a mixture distribution to generate a speaker model (step S104). The modeling unit 23 then provides parameters representing the speaker models to the matching score calculating unit 24. The matching score calculating unit 24 reads features of the frames included in each analysis period from the storage unit 14. The matching score calculating unit 24 then applies to the speaker model of one of analysis periods the features of the frames in the other analysis period and applies the features of the frames to the speaker model of the same analysis period, thereby calculating a matching score (step S105). The matching score calculating unit 24 stores the matching score in the storage unit 14 together with the candidate speaker point.

The processing unit 13 determines whether or not the candidate speaker change point is the time point one analysis period length before the end of the voice signal, i.e., whether or not the candidate speaker change point is the last candidate (step S106). When the candidate speaker change point is not the last candidate (No at step S106), the analysis period setting unit 22 sets the next candidate speaker change point at a time point a predetermined interval after the candidate speaker change point (step S107). Then the processing unit 13 executes step S103 and the subsequent steps.

On the other hand, when the candidate speaker change point is the last candidate (Yes at step S106), the change point detecting unit 25 detects, among candidate speaker change points, a point at which the matching score is the local minimum and less than or equal to the detection threshold as a speaker change point (step S108). Then the processing unit 13 ends the speaker change detection process.

As has been described above, the speaker change detection device calculates a matching score for each candidate on the basis of likelihood that can be obtained by inputting a feature vector extracted from the other analysis period into a speaker model obtained for each of analysis periods before and after the candidate speaker change point. When the group of speakers speaking in one of the two analysis periods differs from the group of speakers speaking in the other analysis period, the matching score will be lower than the matching score when the groups of speakers are the same, regardless of the numbers of speakers in the groups.

For this reason, the speaker change detection device can accurately detect a time point at which a group of speakers has changed in a voice signal on the basis of the matching scores. Further, since the speaker change point detection device does not use the number of speakers for deriving a speaker model, the speaker change point detection device can accurately detects a point at which a group of speakers has changed even when the number of speakers is not known beforehand.

There may be an analysis period in which any of the speakers in a group is speaking little or nothing when a speaker group change has not occurred.

Figure 8:
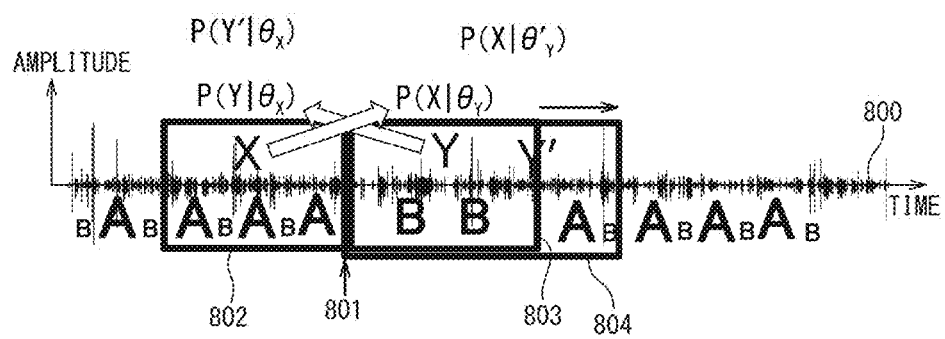
FIG. 8 is a diagram illustrating an example of the relationship between analysis period and speaker when any of the speakers in a group of speakers are speaking little in an analysis period.

FIG. 8 is a diagram illustrating an example of the relationship between analysis period and speakers when one of the speakers in a group of speakers is speaking little in an analysis period. In FIG. 8, the horizontal axis represents time and the vertical axis represents the amplitude of a voice signal. Symbols 'A' and 'B' under the voice signal 800 indicate speakers who are speaking at the time points.

In this example, speaker 'B' is speaking little in an analysis period 802 set before a candidate speaker change point 801. On the other hand, speaker 'A' is speaking nothing in an analysis period 803 set after the candidate speaker change point 801. Accordingly, features of the voice of speaker 'B' in the analysis period 802 are not reflected in a generated speaker model $\theta_X$. Similarly, features of the voice of speaker 'A' in the analysis period 803 are not reflected in a generated speaker model $\theta_Y$. Accordingly, likelihood $P(Y|\theta_X)$ that can be obtained by inputting a feature vector Y extracted from the analysis period 803 into the speaker model $\theta_X$ for the analysis period 802 is significantly lower than likelihood $P(X|\theta_X)$ that can be obtained by inputting a feature vector X extracted from the analysis period 802 into the speaker model $\theta_X$. Similarly, likelihood $P(X|\theta_Y)$ is significantly lower than likelihood $P(Y|\theta_Y)$. Therefore, the matching score at the candidate speaker change point 801 is low and the candidate speaker change point 801 may be erroneously determined to be a speaker change point.

However, when the analysis period 803 is extended to a later time point, the extended analysis period 804 will include a period in which speaker 'A' in addition to speaker 'B' is speaking. Accordingly, a speaker model $\theta'_Y$ generated for the extended analysis period 804 includes features of the voice of speaker 'A' as well. Therefore, the likelihood $P(X|\theta'_Y)$ that can be obtained by inputting a feature vector X extracted from the analysis period 802 into the speaker model $\theta'_Y$ will be higher than the likelihood $P(X|\theta_Y)$. Since a feature vector Y' extracted from the extended analysis period 804 also includes features of the voice of speaker 'A', the likelihood $P(Y'|\theta_X)$ will be higher than the likelihood $P(Y|\theta_X)$. As a result, the matching score for the candidate speaker change point 801 calculated from the analysis periods 802 and 804 will be higher than the matching score calculated from the analysis periods 802 and 803.

According to a variation, the analysis period setting unit 22 extends at least one of the analysis periods for a candidate speaker change point determined to be a speaker change point by the change point detecting unit 25 in the direction opposite to the candidate speak change point. Then the modeling unit 23 reads features in the frames included in the extended analysis period from the storage unit 14 and re-generates a speaker model on the basis of the features, thereby updating the speaker model. The matching score calculating unit 24 recalculates the matching score for the candidate speaker change point by using the updated speaker model and a feature vector extracted from the extended analysis period, thereby updating the matching score. When the updated matching score is lower than or equal to a detection threshold, the change point detecting unit 25 detects the candidate speaker change point as a speaker change point again. On the other hand, when the updated matching score is higher than the detection threshold, the change point detecting unit 25 determines that the candidate speaker change point is not a speaker change point.

According to the variation, the speaker change detection device can prevent false detection of a speaker group change when any of the speakers is speaking little in a certain period.

According to another variation, the modeling unit 23 may use a codebook for vector quantization of features as a speaker model of each analysis period. In this case, a speaker model includes the average value of features for each cluster obtained by clustering of features in the frames included in an analysis period.

In this case, the matching score calculating unit 24 calculates the matching score for each candidate speaker change point in accordance with the following equation.

$$\text{matching score}(X_n;Y_n) = \{D(X_n|\theta_{Yn}) + D(Y_n|\theta_{Xn}) - D(X_n|\theta_{Xn}) - D(Y_n|\theta_{Yn})\} \quad (6)$$

where n represents an index of a candidate speaker change point of interest. Vector $X_n$ is a feature vector in which features in frames extracted from an analysis period before the candidate speaker change point of interest are arranged in a time sequence. Similarly, the vector $Y_n$ is a feature vector in which features in frames extracted from an analysis period after the candidate speaker change point of interest are arranged in a time sequence. $\theta_{Xn}$ is a speaker model obtained for the analysis period before the candidate speaker change point of interest as a codebook. Similarly, $\theta_{Yn}$ is a speaker model obtained for the analysis period after the candidate speaker change point of interest as a codebook. D(a|b) is an average quantization distortion of feature vector a for codebook b which is a speaker model. The average quantization distortion D(a|b) can be calculated, for example, as the average of distances from the features included in the feature vector a to the closest one of the average values of features of the clusters included in a codebook which is a speaker model.

Alternatively, the matching score calculating unit 24 may calculate the matching score for each candidate speaker change point in accordance with the following equation instead of equation (6).

$$\text{matching score}(X_n;Y_n) = \{(D(X_n|\theta_{Yn}) + D(Y_n|\theta_{Xn}) - D(X_n|\theta_{ALL}) - D(Y_n|\theta_{ALL})\} \quad (7)$$

where $\theta_{ALL}$ is a speaker model obtained as a codebook for an analysis period including the whole voice signal. $D(X_n|\theta_{ALL})$ and $D(Y_n|\theta_{ALL})$ are the average quantization distortion of a feature vector $X_n$ extracted from an analysis period before a candidate speaker change point of interest and the average quantization distortion of a feature vector $Y_n$ extracted from an analysis period after the candidate speaker change point of interest, respectively, for the speaker model $\theta_{ALL}$. Note that the matching score calculating unit 24 calculate a value that can be obtained by normalizing a matching score obtained according to equation (6) or (7) as a matching score.

According to the variation, the speaker change detection device can reduce the amount of computation for generating speaker models and calculating matching scores.

According to yet another variation, the modeling unit 23 may decimate frames in analysis periods at a predetermined decimation rate and may use features extracted from the remaining frames to generate speaker models. Furthermore, the matching score detecting unit 24 may use features from frames that remained as a result of the decimation as feature vectors to calculate matching scores for each analysis period. In this case, the matching score calculating unit 24 may use features from frames used for generating the speaker models to calculate matching scores. Alternatively, the matching score calculating unit 24 may use features extracted from frames that are different from frames used in generating the speaker model as features to be applied to the speaker models to calculate matching scores. Furthermore, in the variation, the feature extracting unit 21 may extract features only from frames used in generation of speaker models or calculation of matching scores.

Figure 9:
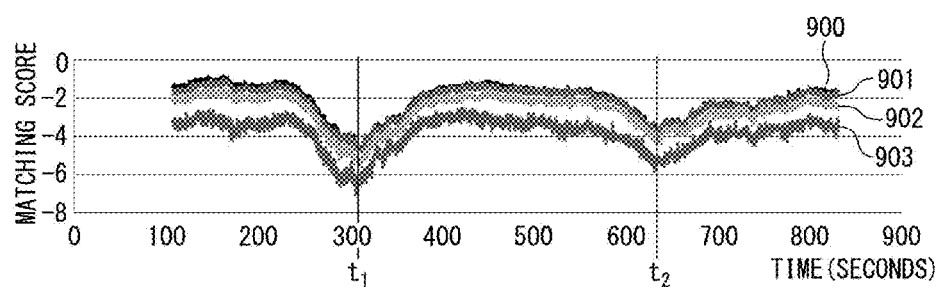
FIG. 9 is a diagram illustrating the relationship between decimation rate and matching score.

FIG. 9 is a diagram illustrating the relationship between decimation rate and matching score. In FIG. 9, the horizontal axis represents time and the vertical axis represents matching score. In this example, time $t_1$ and time $t_2$ are speaker change points. Plot 900 represents matching scores when frames are not decimated. Plot 901 represents matching scores when the decimation rate is 1/2, i.e., when features from one frame in every two frames are used for generation of a speaker model and calculation of a matching score. Plot 902 represents the matching scores when the decimation rate is 1/4, i.e., when features from one frame in every four frames are used for generation of a speaker model and calculation of a matching score. Plot 903 represents matching scores when the decimation rate is 1/8, i.e., when features from one frame in every eight frames are used for generation of a speaker model and calculation of a matching score. Note that the matching scores in this example have been calculated in accordance with equation (4).

As can be seen from plots 900 to 903, the matching scores are local minimum at speaker change points regardless of decimation. However, the matching score generally decreases as the decimation rate increases. This is because as decimation of frames increases, the precision of speaker models decreases and because atypical features included in analysis periods are input into mixture distributions representing the speaker models and therefore the influence of obtained probability on the matching score relatively increases.

As illustrated in FIG. 9, the matching score decreases as decimation of the frame increases. Accordingly, the detection threshold used by the change point detecting unit 25 for determining whether or not a speaker group change has occurred is set to a smaller value as decimation of the frame increases. For example, the detection threshold Thm is determined in accordance with the following equation.

$$Thm = Th1 - a(m-1) \quad (8)$$

where m is the number of steps that is equivalent to the number of frames that are represented by one frame resulting from the decimation, i.e., the reciprocal of the decimation rate. Th1 is the detection threshold used when frames are not decimated (m=1) and a is a coefficient having a positive value. Thm is the detection threshold used when the decimation rate is 1/m.

According to the variation, the speaker change detection device can reduce the amount of computation for generating speaker models and calculating matching scores. Note that the speaker change detection device may omit frame decimation when generating speaker models and may decimate frames in analysis periods when calculating matching scores. In this case, the change point detecting unit 25 may use the detection threshold used when the number of steps is 1.

A speaker change detection device according to any of the embodiment and the variations described above may be implemented in a server-client system.

FIG. 10 is a schematic configuration diagram of a server-client system in which a speaker change detection device according to any of the embodiment and its variations described above is implemented. The server-client system 100 includes a terminal 110 and a server 120, and the terminal 110 and the server 120 are capable of communicating with each other through a communication network 130. Note that the server-client system 100 may include a plurality of terminals 110. Similarly, the server-client system 100 may include a plurality of servers 120.

The terminal 110 includes a voice input unit 111, storage unit 112, a communication unit 113, and a control unit 114. The input unit 111, the storage unit 112 and the communication unit 113 are connected to the control unit 114 through a bus, for example.

The voice input unit 111 includes an audio interface and A/D converter, for example. The voice input unit 111 acquires a voice signal which is an analog signal including a conversation from a telephone line and samples the voice signal at a predetermined sampling rate to digitize the voice signal, for example. The voice input unit 111 outputs the digitized voice signal to the control unit 114.

The storage unit 112 includes a nonvolatile semiconductor memory and a volatile semiconductor memory, for example. The storage unit 112 stores a computer program for controlling the terminal 110, identification information of the terminal 110, various kinds of data and a computer program used in speaker change detection process, among others.

The communication unit 113 includes an interface circuit for connecting the terminal 110 to the communication network 130. The communication unit 113 sends features in frames received from the control unit 114 to the server 120 through the communication network 130 together with the identification information of the terminal 110.

The control unit 114 includes one or more processors and peripheral circuitry thereof. The control unit 114 implements the function of the feature extracting unit 21 among the functions of processing unit according to any of the embodiment and the variations described above. Specifically, the control unit 114 divides a voice signal into frames and extracts features representing features of voices of speakers from each frame. The control unit 114 then sends the features from each frame to the server 120 through the communication unit 113 and communication network 130 together with the identification information of the terminal 110.

The server 120 includes a communication unit 121, a storage unit 122, and a processing unit 123. The communication unit 121 and the storage unit 122 are connected to the processing unit 123 through a bus.

The communication unit 121 includes an interface circuit for connecting the server 120 to the communication network 130. The communication unit 121 receives features feature in each frame and the identification information of the terminal 110 from the terminal 110 through the network 130 and passes the features and the identification information to the processing unit 123.

The storage unit 122 includes a nonvolatile semiconductor memory and a volatile semiconductor memory, for example. The storage unit 122 stores a computer program for controlling the server 120, among others. The storage unit 122 may store a computer program for executing the speaker change detection process and features in each frame received from each terminal.

The processing unit 123 includes one or more processors and peripheral circuitry thereof. The processing unit 123 implements the functions of the units of the processing unit of the speaker change detection device according to any of the embodiment and the variations described above other than the feature extracting unit 21. Specifically, the processing unit 123 detects a speaker change point in a voice signal from frame-by-frame features received from the terminal 110. The processing unit 123 may apply a speaker indexing technique to periods in which the same group of speakers are speaking to assign speaker identification information to each frame. The processing unit 123 then uses the speaker identification information assigned to each frame, for example, to extract frames in which a particular speaker has spoken. Using the extracted frames, the processing unit 123 may estimate the state of mind of the particular speaker by using a method for estimating speaker's state of mind from a voice signal. For example, when the state of mind of the particular speaker is abnormal, the processing unit 123 may determine that an abnormal conversation, such as remittance fraud telephone conversation, is being carried out and may report that abnormal conversation to a security system (not depicted) through the communication unit 121 together with the identification information of the terminal 110. This allows the operator of the security system to help the user of the terminal 110.

According to the embodiment, individual terminals 110 need only to extract features in each frame of a voice signal in a recorded conversation and sends the features to the server 120. Note that the terminal 110 may send the voice signal itself to the server 120. In this case, the processing unit 123 of the server 120 implements the functions of the processing unit of the speaker change detection device according to any of the embodiment and the variations describe above.

A computer program that causes a computer to implement the functions of the processing unit of the speaker change detection device according to any of the embodiments and the variations described above may be provided in the form of a computer program recorded on a computer-readable medium such as a magnetic recording medium or an optical recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. A speaker change detection device comprising:
a processor configured to:
extract features representing features of a human voice in each frame having a predetermined time length from a voice signal including a conversation between a plurality of speakers;

set, for each of a plurality of different time points in the voice signal, a first analysis period before the time point and a second analysis period after the time point;

generate, for each of the plurality of time points, a first speaker model representing features of voices of a group of at least two speakers speaking in the first analysis period on the basis of a distribution of the features of a plurality of frames included in the first analysis period and a second speaker model representing features of voices of a group of at least two speakers speaking in the second analysis period on the basis of a distribution of the features in a plurality of frames included in the second analysis period;

calculate, for each of the plurality of time points, a matching score representing the likelihood of similarity of features between the group of speakers in the first analysis period and the group of speakers in the second analysis period by applying the features in a plurality of frames included in the second analysis period to the first speaker model and applying the features of a plurality of frames included in the first analysis period to the second speaker model; and detect a speaker change point at which a change from a group of speakers speaking before the speaker change point to another group of speakers speaking after the speaker change point occurs in the voice signal on the basis of the matching score for each of the plurality of time points.

2. The speaker change detection device according to claim 1, wherein, the detecting the speaker change point, when a local minimum matching score in a time sequence among the matching scores for the plurality of time points is lower than or equal to a predetermined threshold, detects a time point corresponding to the local minimum matching score as the speaker change point.

3. The speaker change detection device according to claim 1, wherein, the processor is further configured to:

extend, when a local minimum matching score in a time sequence among the matching scores for the plurality of time points is lower than or equal to a predetermined threshold, at least one of the first analysis period and the second analysis period for a first time point corresponding to the local minimum matching score in a direction away from the first time point;

update, for each extended analysis period for the first time point, one of the first speaker model and the second speaker model that corresponds to the extended analysis period on the basis of a distribution of the features in a plurality of frames included in the extended analysis period;

update the matching score of the first time point, when only one of the first analysis period or the second analysis period for the first time point is extended, by applying the features in a plurality of frames included in the extended one of the first analysis period and the second analysis period for the first time point to the speaker model of the other of the first analysis period and the second analysis period and applying the features in a plurality of frames included in the other analysis period to the updated speaker model; and update the matching score of the first time point, when both of the first analysis period and the second analysis period for the first time point are extended, by applying the features in a plurality of frames included in the extended first analysis period to the updated second speaker model and applying the features in a plurality of frames included in the extended second analysis period to the updated first speaker model, wherein the detect the speaker change point detects the first time point as the speaker change point when the updated matching score is lower than or equal to the predetermined detection threshold.

4. A speaker change detection method comprising:

extracting, by a processor, features representing features of human voice in each frame having a predetermined time length from a voice signal including a conversation between a plurality of speakers;

setting, by the processor, for each of a plurality of different time points in the voice signal, a first analysis period before the time point and a second analysis period after the time point;

generating, by the processor, for each of the plurality of time points, a first speaker model representing features of voices of a group of at least two speakers speaking in the first analysis period on the basis of a distribution of the features of a plurality of frames included in the first analysis period and a second speaker model representing features of voices of a group of at least two speakers speaking in the second analysis period on the basis of a distribution of the features in a plurality of frames included in the second analysis period;

calculating, by the processor, for each of the plurality of time points, a matching score representing the likelihood of similarity of features between the group of speakers in the first analysis period and the group of speakers in the second analysis period by applying the features in a plurality of frames included in the second analysis period to the first speaker model and applying the features of a plurality of frames included in the first analysis period to the second speaker model; and detecting, by the processor, a speaker change point at which a change from a group of speakers speaking before the speaker change point to another group of speakers speaking after the speaker change point occurs in the voice signal on the basis of the matching score for each of the plurality of time points.

5. The speaker change detection method according to claim 4, wherein, the detecting the speaker change point, when a local minimum matching score in a time sequence among the matching scores for the plurality of time points is lower than or equal to a predetermined threshold, detects a time point corresponding to the local minimum matching score as the speaker change point.

6. The speaker change detection method according to claim 4, further comprising:

extending, when a local minimum matching score in a time sequence among the matching scores for the plurality of time points is lower than or equal to a predetermined threshold, at least one of the first analysis period and the second analysis period for a first time point corresponding to the local minimum matching score in a direction away from the first time point;

updating, for each extended analysis period for the first time point, one of the first speaker model and the second speaker model that corresponds to the extended analysis period on the basis of a distribution of the features in a plurality of frames included in the extended analysis period;

updating the matching score of the first time point, when only one of the first analysis period or the second analysis period for the first time point is extended, by applying the features in a plurality of frames included in the extended one of the first analysis period and the second analysis period for the first time point to the speaker model of the other of the first analysis period and the second analysis period and applying the features in a plurality of frames included in the other analysis period to the updated speaker model; and updating the matching score of the first time point, when both of the first analysis period and the second analysis period for the first time point are extended, by applying the features in a plurality of frames included in the extended first analysis period to the updated second speaker model and applying the features in a plurality of frames included in the extended second analysis period to the updated first speaker model, wherein the detecting the speaker change point detects the first time point as the speaker change point when the updated matching score is lower than or equal to the predetermined detection threshold.

7. A non-transitory computer-readable recording medium having recorded thereon a speaker change detection computer program that causes a computer to execute a process comprising:

extracting features representing features of human voice in each frame having a predetermined time length from a voice signal including a conversation between a plurality of speakers;

setting, for each of a plurality of different time points in the voice signal, a first analysis period before the time point and a second analysis period after the time point;

generating, for each of the plurality of time points, a first speaker model representing features of voices of a group of at least two speakers speaking in the first analysis period on the basis of a distribution of the features of a plurality of frames included in the first analysis period and a second speaker model representing features of voices of a group of at least two speakers speaking in the second analysis period on the basis of a distribution of the features in a plurality of frames included in the second analysis period;

calculating, for each of the plurality of time points, a matching score representing the likelihood of similarity of features between the group of speakers in the first analysis period and the group of speakers in the second analysis period by applying the features in a plurality of frames included in the second analysis period to the first speaker model and applying the features of a plurality of frames included in the first analysis period to the second speaker model; and detecting a speaker change point at which a change from a group of speakers speaking before the speaker change point to another group of speakers speaking after the speaker change point occurs in the voice signal on the basis of the matching score for each of the plurality of time points.

* * * * *